Feb. 10, 1931.  B. G. NICE  1,791,833
CASTER
Filed Feb. 25, 1930

WITNESS:
Robt R Kitchel

INVENTOR
Budd G. Nice
BY
Augustus B Stoughton
ATTORNEY.

Patented Feb. 10, 1931

1,791,833

UNITED STATES PATENT OFFICE

BUDD G. NICE, OF HATBORO, PENNSYLVANIA

CASTER

Application filed February 25, 1930. Serial No. 431,160.

The present invention relates to pressed steel ball bearing swivel type casters, and among its objects are, first, to obviate scuffing of floors; second, to simplify the construction; third, to improve the operation; and fourth, to avoid excessive expense in manufacture and to provide for ease and facility in swiveling.

A feature of the invention is that the circles of balls are of the same and of comparatively large diameter and are arranged in alignment, so that the circles of balls are directly superposed, and this in connection with other elements of the construction facilitates the swiveling of the caster and thereby opposes or prevents scuffing of floors. Another feature of the invention is that there are three rings and that the other elements or parts are attached to them, providing a strong, efficient and comparatively inexpensive construction.

The invention will be claimed at the end hereof but will be first described in connection with the accompanying drawing forming part hereof and in which Figure 1 is an elevational view, principally in central section, of a caster embodying features of the invention.

Figure 1:
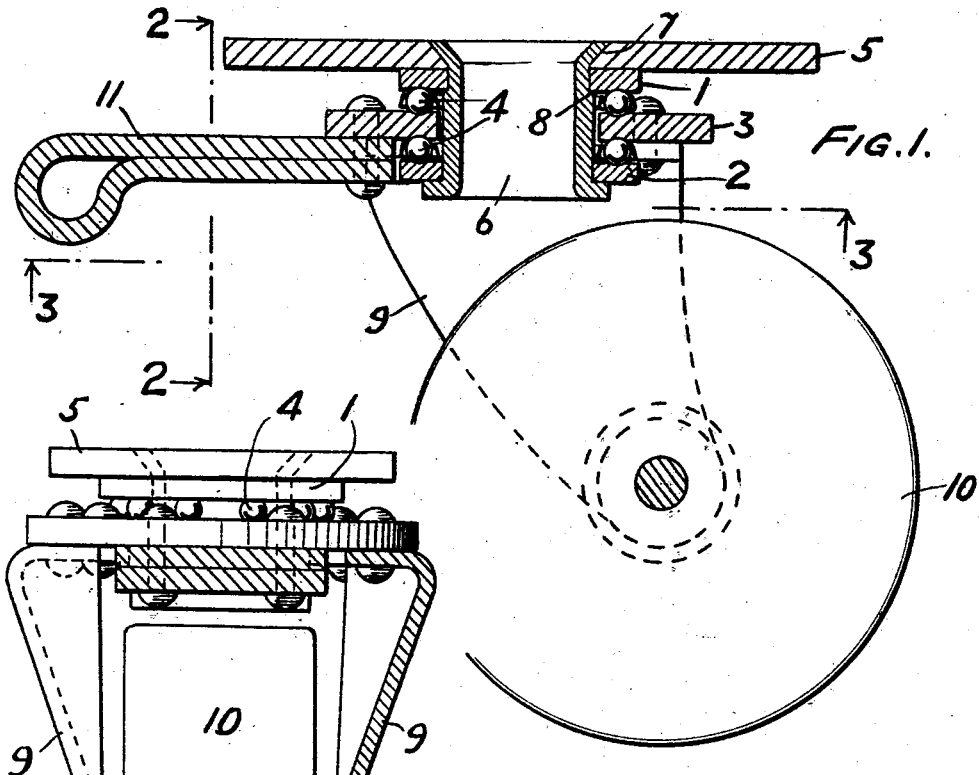
Figure 2:
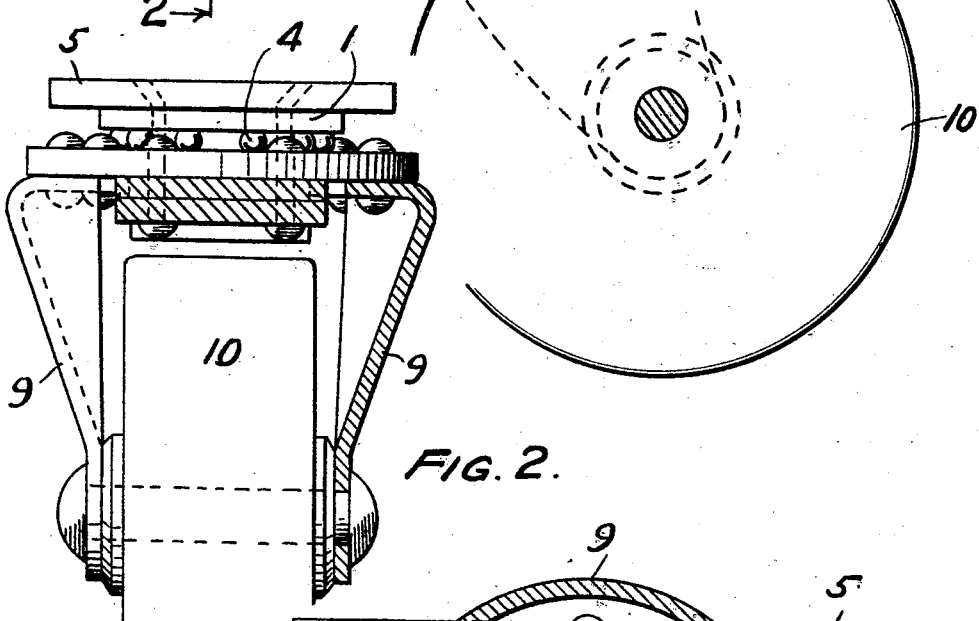
Fig. 2 is a sectional view taken on the line 2—2 of Figure 1.
Figure 3:
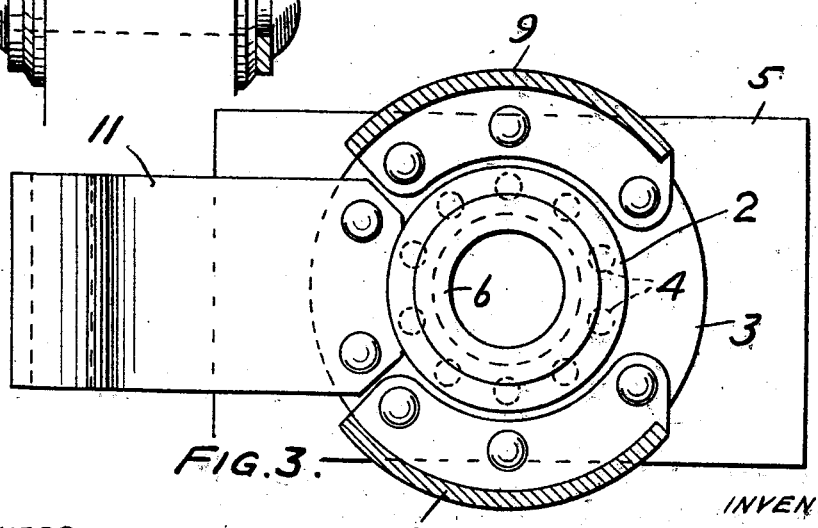
Fig. 3 is a sectional view taken on the line 3—3 of Figure 1.

In the drawing there is a group of three overlapping hard metal rings arranged the outer ones 1 and 2 to project beyond the middle one 3 at the center or axis, and the middle one 3 to project beyond the outer ones 1 and 2 at the rim. These rings are provided with circular ball grooves arranged in confronting relation, and the grooves are of the same diameter and are disposed one in line with the other, or, in other words, one directly above the other. There is a circle of balls 4 in and between each of the confronting grooves and ball retainers or separators are shown. 5 is a base plate shown as rectangular and through it there is a hole conforming to the holes in the rings and shown as provided with a countersunk rim. 6 is a metal tube arranged through the rings and base plate and provided with an external shoulder 8 engaging the inner face of the outside ring 1. One end of this tube is flared engaging the countersunk portion 7 of the hole in the base plate 5 and the other end of this tube is outwardly flanged engaging the outer face of the outside ring 2. Thus the parts may be readily assembled and secured together. 9 represents arms secured to the ring 3 or, more accurately, to the underface of the portion thereof that extends beyond or outside of the rings 1 and 2. A wheel 10 is revolubly mounted in the arms 9. 11 is a draft bar which, when employed, is secured to a projecting portion of the ring 3 as shown on the under face thereof.

It may be remarked that the balls or circles of balls 4 are in use disposed one directly above the other and that the diameters of the circles of balls are the same and are comparatively large, so that ease of swiveling is provided for.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A caster of the type recited comprising in combination a group of three overlapping hard metal rings arranged the outer ones projecting beyond the middle one at the center and the middle one projecting beyond the outer ones at the rim, said rings having confronting circular ball grooves of the same diameter and disposed one in line with the other, a circle of balls in each of said confronting grooves, a base plate having a countersunk hole, a tube arranged through the rings and having a shoulder engaging the inner face of one of the outside rings, said tube having one end flared engaging the countersunk portion of the hole and the other end outwardly flanged engaging the outer face of the other of the outside rings, arms secured to the middle ring, and a wheel revolubly mounted in the arms, 2. A caster of the type recited comprising in combination a group of three overlapping hard metal rings arranged the outer ones projecting beyond the middle one at the center and the middle one projecting beyond the outer ones at the rim, said rings having confronting circular ball grooves of the same diameter and disposed one in line with the other, a circle of balls in each of said confronting grooves, a base plate having a hole, a tube arranged through the rings and base plate and flanged at its ends, arms secured to the middle ring, and a wheel revolubly mounted in the arms.

BUDD G. NICE.